United States Patent
Huang et al.

(10) Patent No.: US 8,750,576 B2
(45) Date of Patent: Jun. 10, 2014

(54) METHOD OF MANAGING VISITING GUESTS BY FACE RECOGNITION

(75) Inventors: Chih-Hsung Huang, Taipei (TW); Tsung-Han Lee, Taipei (TW)

(73) Assignee: Taiwan Colour and Imaging Technology Corporation, Taipei (TW)

( * ) Notice: Subject to any disclaimer, the term of this patent is extended or adjusted under 35 U.S.C. 154(b) by 294 days.

(21) Appl. No.: 13/454,662

(22) Filed: Apr. 24, 2012

(65) Prior Publication Data

US 2013/0279767 A1 Oct. 24, 2013

(51) Int. Cl.
*G06K 9/00* (2006.01)

(52) U.S. Cl.
USPC .......................................................... 382/117

(58) Field of Classification Search
None
See application file for complete search history.

(56) References Cited

U.S. PATENT DOCUMENTS

| | | | |
|---|---|---|---|
| 5,423,574 A * | 6/1995 | Forte-Pathroff | 283/75 |
| 5,978,493 A * | 11/1999 | Kravitz et al. | 382/115 |
| 6,714,665 B1 * | 3/2004 | Hanna et al. | 382/117 |
| 6,801,640 B1 * | 10/2004 | Okubo et al. | 382/118 |
| 7,164,354 B1 * | 1/2007 | Panzer | 340/539.15 |
| 7,365,643 B1 * | 4/2008 | Cole | 340/539.11 |
| 8,442,277 B1 * | 5/2013 | Newman et al. | 382/117 |
| 2001/0030607 A1 * | 10/2001 | Osborne et al. | 340/573.4 |
| 2006/0274918 A1 * | 12/2006 | Amantea et al. | 382/117 |
| 2007/0159332 A1 * | 7/2007 | Koblasz | 340/572.1 |
| 2007/0288263 A1 * | 12/2007 | Rodgers | 705/2 |
| 2008/0015903 A1 * | 1/2008 | Rodgers | 705/3 |
| 2008/0075334 A1 * | 3/2008 | Determan et al. | 382/117 |
| 2009/0048936 A1 * | 2/2009 | Lerch et al. | 705/17 |
| 2009/0179417 A1 * | 7/2009 | Murra | 283/77 |
| 2009/0245594 A1 * | 10/2009 | Abramovich et al. | 382/117 |

* cited by examiner

*Primary Examiner* — Thomas Conway
(74) *Attorney, Agent, or Firm* — Lin & Associates IP, Inc.

(57) ABSTRACT

A method of managing visiting guests by face recognition includes: extract the face image of the visiting guest; determine if the face image of the guest is stored in the database; display the face image data comprising the face image, guest information and visiting information if the face image is stored or enroll the new face image data and then display the face image data just registered; set up at least one authorized item; execute the visiting goal confined by the authorized items; monitor the status of the visiting guest; wait until the guest leaves; and finally record and update log page and face image data of the visiting guest in the database. Therefore, the method can reduce security guard workload, assist security guards or automatically and solely execute the function of guard entrance without any careless mistakes, and update visiting guest information in real time.

6 Claims, 1 Drawing Sheet

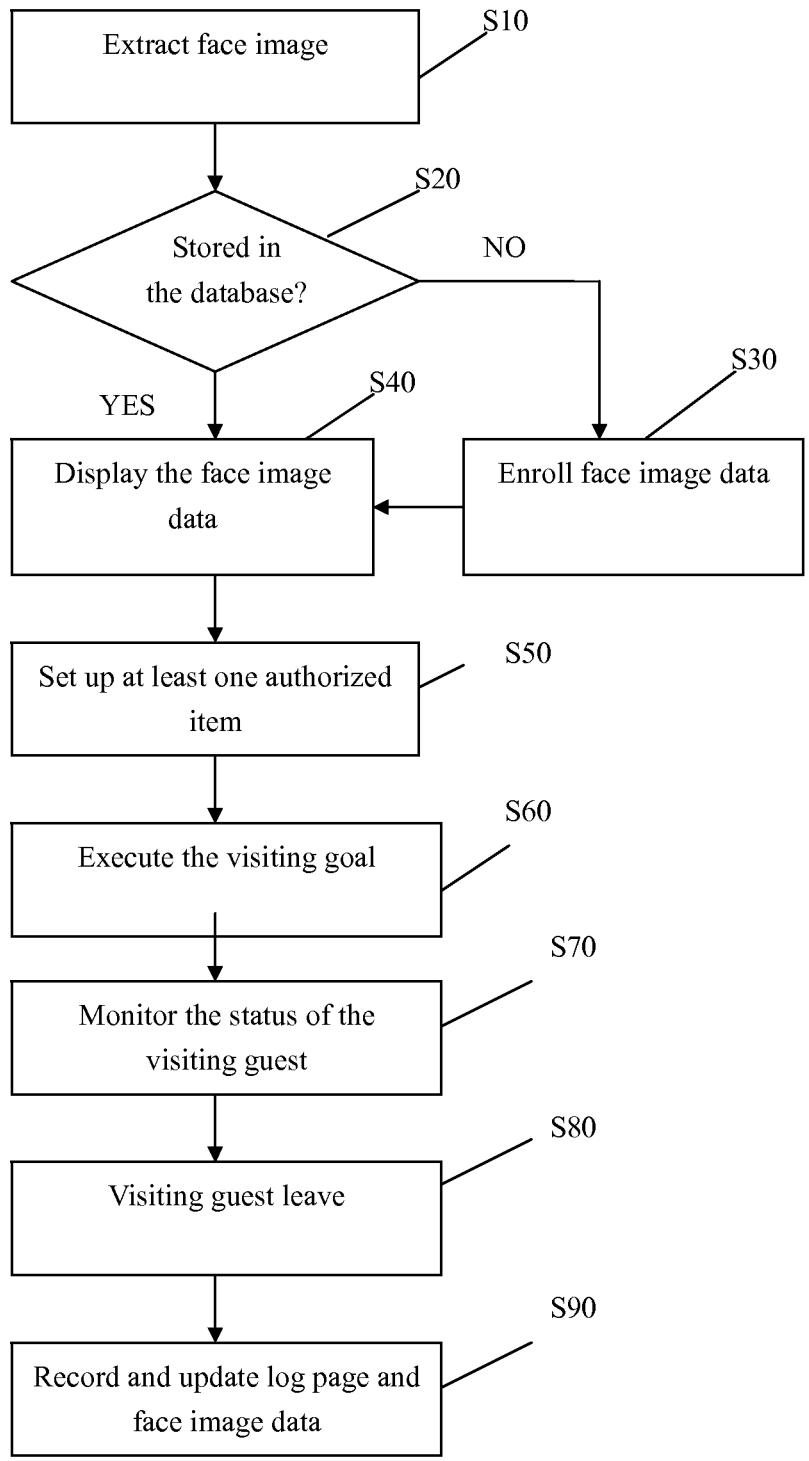

METHOD OF MANAGING VISITING GUESTS BY FACE RECOGNITION

BACKGROUND OF THE INVENTION

1. Field of the Invention

The present invention generally relates to a method of managing visiting guests, and more specifically to using face recognition to reduce the loading of security guards and dynamically updating and recording the information of the visiting guests.

2. The Prior Art

Generally, guard entrance is increasingly important for companies, factories or office buildings. Door guards or security personnels are usually deployed at the entrance door or gate to examine the visiting guests, check the IDs and issue the pass card or badge if the visiting guests are identified and verified. Then, the visited company, department or unit will be informed by calling for confirmation, and the visiting guest is either allowed to go to the destination directly or accompanied by the member from the visited company, department or unit. After the visit finished, the visiting guests need to return the pass card or badge to the door guards or security personnels to get their IDs back.

Thus, the visiting guest should always bring IDs to get approval of pass card or badge. It causes inconvenience for the visiting guest and wastes lots of time in recognition process. Additionally, the member deployed by the visited department to accompany the visiting guest is a waste of human resource, increasing the expenses of the visited department. The guards may tend to fail to correctly examine the visiting guests because of carelessness or eye strain, especially working for a long period of time per day. The security of the factory or office is thus influenced.

For the frequent visiting guests, a method using face recognition to verify the guests and solve all the problems in the prior arts is greatly needed. The guests do not have to bring ID all the time and get rid of most repeatedly processes.

SUMMARY OF THE INVENTION

To overcome the above-mentioned shortcomings in the prior arts, a method of managing visiting guests by face recognition is provided. The method in accordance with the present invention comprises: first, extracting the face image of the visiting guest by an operator or an electronic control device via an image capturing device; determining whether the face image of the guest is stored in a database or not, wherein the database comprises at least a plurality of face images, guest information and visiting information; displaying the guest information of the visiting guest if the face image of the guest is stored in the database or enrolling up the guest information of the visiting guest if the face image of the guest is not stored in the database and then displaying the guest information just enrolled/registered; setting up at least an authorized item by the operator or the electronic control device; executing the visiting goal confined by the authorized item via the electronic control device or the operator using biological mechanism with face recognition; monitoring the status of the visiting guest by the electronic control device or by the operator to continuously examine if the visiting guest violates the authorized item, and informing and reminding a visited department if the authorized item is violated; waiting until the visiting guest leaves; and finally, recording and updating log page and the face image data of the visiting guest in the database. Therefore, the method of the present invention can assist security guards to manage the visiting guests by dramatically reducing their workload, or automatically and solely execute the whole function of guard entrance without any careless mistakes, and update visiting guest information in real time.

BRIEF DESCRIPTION OF THE DRAWINGS

The present invention can be understood in more detail by reading the subsequent detailed description in conjunction with the examples and references made to the accompanying drawings, wherein:

FIG. 1 shows a flow chart to illustrate the processes of the method according to the present invention.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

The flow chart to illustrate the processes of the method of managing visiting guests by face recognition according to the present invention is shown in FIG. 1. The method of the present invention comprises the steps S10 to S90 to assist security guards by dramatically reducing their work loading, or automatically and solely execute the whole function of guard entrance such that the efficiency of managing visiting guests is greatly improved.

First, in step S10, the method according to the present invention extracts the face image of the visiting guest by an operator or an electronic control device. For example, the operator may use an image capturing device, such as a web camera, a digital camera, a digital camcorder, or image sensor, to take a photo or capture the image of the guest and generate the face image.

Then, in step S20, the face recognition process is performed by the electronic control device to determine whether the face image of the guest extracted in step S10 is stored in the database or not. That is, the face recognition process is used to examine the face image in step S10 by comparing with each of the face images stored in the database.

The database comprises at least a plurality of face image data, and each face image data consists of face images, guest information and visiting information which are previously set up by the operator or input by the visiting guest in the remote site using a computer or a remote device through network registration or logging in.

The guest information comprises the face image, name, company, and telephone number of the visiting guest. The visiting information comprises the visited department and the visiting goal to deal with in the visit.

If the face image in step S10 is not stored in the database, step S30 is executed to enroll a new face image data in the database by the visiting guest, the operator or the electronic control device. And then, the new face image data just enrolled/registered is displayed on a display device.

If it is determined the face image in step S10 is previously stored in the database, then step S40 is preformed to display the face image data of the visiting guest on the display device for double check by the operator.

In Step 50, at least one authorized item is set up by the operator or the electronic control device. For example, the authorized item may comprise the visiting time and the visiting location information. The visiting location information comprises the name of the building, the area name, or the name of the meeting or seminar to attend or check in.

Then, in step 60, the visiting goal confined by the authorized item is implemented by the visiting guest via the electronic control device or by the operator using biological mechanism with face recognition. The visiting goal comprises access of entrance, attend exhibition, register and enroll meeting/seminar.

Step 70 is thus preformed to monitor the status of the visiting guest. Specifically, the electronic control device or the operator may continuously examine and determine if the visiting guest violates the authorized item. If the authorized item is violated, the visited department is informed and reminded by the operator or the electronic control device. For example, the operator may make a call to the visited department or the electronic control device may broadcast via the voice system when the visiting time is expired or in advance of a predetermined period of time, such as 5 or 10 minutes.

In step 80, wait until the visiting guest leaves, and finally in step 90, log page and the face image data related to the visiting guest is recorded and updated in the database for tracking the visiting guest if needed hereafter.

Also, the above-mentioned electronic control device can be implemented by a personal computer, server, system chip microcontroller, microprocessor or central processing unit to automatically perform the face recognition.

One of the features provided by the present invention is that the visiting guest can previously and remotely set up the face image data in the database in a remote manner, such as network or on-line registration, and then personally arrive the destination site to accept the face recognition to get approval of guard entrance. The flow of managing the visiting guests is thus simplified and accelerated such that the guest does not wait to build up the face image data in step S40 and can save some precious time.

Additionally, the electronic control device may be controlled by the operator to help manage the visiting guests so as to reduce the operator's work loading, get rid of mistakes due to carelessness or eye strain, and further improve the security and efficiency of entrance guard.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of managing visiting guests by face recognition, comprising steps of:
    extracting a face image of a visiting guest by an operator or an electronic control device via an image capturing device;
    executing a face recognition process by examining the face image of the visiting guest determined by the electronic control device if the face image of the visiting guest is stored in a database, wherein said database comprises at least a plurality of face image data, and each face image data consists of the face image, guest information and visiting information which are previously set up by the operator or the visiting guest;
    displaying the face image data of the visiting guest if the face image of the visiting guest is stored in the database, or enroll a new face image data of the visiting guest if the face image of the visiting guest is not stored in the database and then displaying the new face image data of the visiting guest just enrolled/registered;
    setting up at least one authorized item by the operator or the electronic control device;
    implementing a visiting goal confined by the authorized item via the electronic control device or the operator using biological mechanism with face recognition;
    monitoring the status of the visiting guest by the electronic control device or by the operator to continuously examine if the visiting guest violates the authorized item, and informing and reminding a visited department if the authorized item is violated;
    waiting until the visiting guest leaves; and
    recording and updating log page and the face image data of the visiting guest in the database.

2. The method as claimed in claim 1, wherein said image capturing device comprises a web camera, a digital camera, a digital camcorder, or an image sensor.

3. The method as claimed in claim 1, wherein said guest information comprises the visited department and the face image, name, company, telephone, visiting goal of the visiting guest.

4. The method as claimed in claim 1, wherein said authorized item comprises visiting time and visiting location information, and said visiting location information comprises a building name, an area name or a name of a meeting to attend or check in.

5. The method as claimed in claim 1, wherein said visiting goal comprises access of entrance, attend exhibition, register and enroll meeting/seminar.

6. The method as claimed in claim 1, wherein said electronic control device comprises a personal computer, server, system chip microcontroller, microprocessor or central processing unit, and said electronic control device is connected to a remote control device via a wireless or wired network.

* * * * *